(12) United States Patent
Carnevali et al.

(10) Patent No.: US 11,502,464 B2
(45) Date of Patent: Nov. 15, 2022

(54) MULTI-PORT USB CABLE WITH CABLE RETENTION AND METHODS OF MAKING AND USING

(71) Applicant: National Products, Inc., Seattle, WA (US)

(72) Inventors: Jeffrey D. Carnevali, Seattle, WA (US); Scott Anderson, Seattle, WA (US)

(73) Assignee: National Products, Inc., Seattle, WA (US)

( * ) Notice: Subject to any disclaimer, the term of this patent is extended or adjusted under 35 U.S.C. 154(b) by 332 days.

(21) Appl. No.: 16/862,100

(22) Filed: Apr. 29, 2020

(65) Prior Publication Data

US 2021/0344148 A1    Nov. 4, 2021

(51) Int. Cl.
*H01R 31/02* (2006.01)
*G06F 13/42* (2006.01)

(52) U.S. Cl.
CPC ......... *H01R 31/02* (2013.01); *G06F 13/4282* (2013.01); *G06F 2213/0042* (2013.01)

(58) Field of Classification Search
CPC ..................... G06F 13/4282; G06F 2213/0042
USPC ........................... 439/638, 660, 540.1, 541.5
See application file for complete search history.

(56) References Cited

U.S. PATENT DOCUMENTS

| | | | | |
|---|---|---|---|---|
| 5,341,812 A * | 8/1994 | Allaire | ................... | H01R 31/06 600/508 |
| 6,697,892 B1 * | 2/2004 | Laity | ..................... | G06F 13/385 710/63 |
| 6,738,856 B1 * | 5/2004 | Milley | .................. | G01J 3/0264 710/316 |
| 6,997,733 B2 * | 2/2006 | Peng | .................. | H01R 13/6582 439/353 |
| 7,121,852 B2 * | 10/2006 | Ng | ......................... | H01R 35/04 439/31 |
| 7,252,542 B2 * | 8/2007 | Chen | ....................... | H01R 27/02 439/502 |
| 7,473,141 B2 * | 1/2009 | Liao | ....................... | H01R 27/00 439/640 |
| 7,618,377 B2 * | 11/2009 | McAtamney | .......... | A61B 5/301 600/300 |
| 7,857,664 B2 * | 12/2010 | Waryck | .................. | H01R 27/02 439/638 |

(Continued)

*Primary Examiner* — Harshad C Patel
(74) *Attorney, Agent, or Firm* — Branch Partners PLLC; Bruce E. Black

(57) ABSTRACT

A USB cable that includes a cable coupling element selected from a first connector, a printed circuit board, or a device, as well as a multi-port connector that includes a multi-port connector including a housing, at least two ports defined by the housing, at least two female USB connectors disposed within the housing, and at least two retention arms extending from the housing. The USB cable also includes conductors electrically coupling the first connector to the at least two female USB connectors and a jacket extending between the first connector and the multi-port connector, wherein the conductors are at least partially disposed within the jacket. In another USB cable, in addition to or as an alternative to the retention arms, each of the at least two female USB connectors is spaced at least 10 mm from the opening of the port through which the female USB connector is accessible.

19 Claims, 4 Drawing Sheets

(56) References Cited

U.S. PATENT DOCUMENTS

| | | | | |
|---|---|---|---|---|
| 8,298,003 B2* | 10/2012 | Wu | H01R 27/02 | 439/501 |
| 8,517,772 B2* | 8/2013 | Wu | H01R 24/62 | 439/501 |
| 8,550,856 B2* | 10/2013 | Lin | H01R 31/06 | 439/638 |
| 8,568,160 B2* | 10/2013 | Coggins | A61B 5/303 | 439/502 |
| 8,668,651 B2* | 3/2014 | Burnes | A61B 5/339 | 600/509 |
| 8,694,080 B2* | 4/2014 | Farrior | A61B 5/318 | 600/509 |
| 8,740,641 B2* | 6/2014 | Rostami | H01R 24/28 | 439/502 |
| 8,764,491 B2* | 7/2014 | Wang | H01R 13/508 | 439/660 |
| 8,777,671 B2* | 7/2014 | Huang | H01R 35/04 | 439/11 |
| 8,864,520 B2* | 10/2014 | Lan | H01R 12/714 | 439/607.14 |
| 8,874,819 B2* | 10/2014 | Chen | H01R 31/06 | 710/305 |
| 9,088,087 B2* | 7/2015 | Wardenburg | H01R 13/447 | |
| 9,129,069 B2* | 9/2015 | Lo | G06F 3/023 | |
| 9,306,313 B2* | 4/2016 | Heggemann | H01R 13/40 | |
| 9,385,464 B2* | 7/2016 | Wu | H01R 27/00 | |
| 9,966,716 B2* | 5/2018 | Soohoo | H01R 31/06 | |
| D819,576 S* | 6/2018 | Hahn | D13/153 | |
| D951,196 S* | 5/2022 | Byrne | D13/133 | |
| 2003/0176109 A1* | 9/2003 | Fukuchi | H01R 31/005 | 439/67 |
| 2008/0133815 A1* | 6/2008 | Mori | G06F 13/4022 | 710/313 |
| 2009/0113101 A1* | 4/2009 | Liu | H01R 31/06 | 710/300 |
| 2016/0202743 A1* | 7/2016 | Li | G06F 13/4282 | 710/313 |
| 2019/0138475 A1* | 5/2019 | Wood | H01R 13/506 | |

* cited by examiner

MULTI-PORT USB CABLE WITH CABLE RETENTION AND METHODS OF MAKING AND USING

FIELD

The present invention is directed to a multi-port cable. The present invention is also directed to a cable with at least two USB female sockets at one end and methods of making and using the cable.

BACKGROUND

Mobile devices, such as tablets, smartphones, mobile phones, and the, like typically include a port for data or power. A variety of peripheral devices can be coupled to the mobile device through the port including, but not limited to, a keyboard, mouse, printer, scanner, storage device, or the like.

BRIEF SUMMARY

One embodiment is a USB cable that includes a cable coupling element selected from a first connector, a printed circuit board, or a device, as well as a multi-port connector that includes a housing, at least two ports defined by the housing, at least two female USB connectors disposed within the housing, and at least two retention arms extending from the housing. A different one of the at least two female USB connectors is accessible through each of the at least two ports and a different one of the at least two retention arms is disposed adjacent an opening of each of the at least two ports. The USB cable also includes conductors electrically coupling the cable coupling element to the at least two female USB connectors and a jacket extending between the cable coupling element and the multi-port connector, wherein the conductors are at least partially disposed within the jacket.

In at least some embodiments, each of the retention arms includes a narrow neck portion adjacent to the housing and a wider band-retention portion adjacent to the narrow neck portion. In at least some embodiments, the at least two ports is exactly two ports and the at least two female USB connectors is exactly two female USB connectors. In at least some embodiments, the at least two retention arms is exactly two retention arms are disposed opposite each other with two ports between the two retention arms.

In at least some embodiments, the USB cable further includes at least two retention bands, wherein each of the retention bands configured to be disposed around a cable attached to one of the at least two female USB connectors and one of the retention arms. In at least some embodiments, each of the ports has an opening defined by the housing and each of the at least two female USB connectors is spaced at least 20 mm from the opening of the port through which the female USB connector is accessible. In at least some embodiments, each of the ports has an opening defined by the housing and each of the at least two female USB connectors is spaced at least 30 mm from the opening of the port through which the female USB connector is accessible.

In at least some embodiments, the cable coupling element is the first connector and the first connector is selected from a USB A connector, USB 3.0 A connector, USB B connector, USB 3.0 B connector, USB C connector, USB Mini-A connector, USB Mini-B connector, USB Micro-A connector, USB Micro-B connector, USB 3.0 Micro-B connector, or a Lightning connector. In at least some embodiments, each of the at least two USB female connectors is selected from a USB A connector, USB 3.0 A connector, USB B connector, USB 3.0 B connector, USB C connector, USB Mini-A connector, USB Mini-B connector, USB Micro-A connector, or a USB Micro-B connector. In at least some embodiments, all of the at least two USB female connectors are a same type of USB connector.

Another embodiment is a USB cable that includes a cable coupling element selected from a first connector, a printed circuit board, or a device, as well as a multi-port connector that includes a housing, at least two ports defined by the housing, and at least two female USB connectors disposed within the housing. A different one of the at least two female USB connectors is accessible through each of the at least two ports and each of the ports has an opening defined by the housing and each of the at least two female USB connectors is spaced at least 10 mm from the opening of the port through which the female USB connector is accessible. The USB cable also includes conductors electrically coupling the cable coupling element to the at least two female USB connectors and a jacket extending between the cable coupling element and the multi-port connector, wherein the conductors are at least partially disposed within the jacket.

In at least some embodiments, the USB cable further includes at least two retention arms extending from the housing of the multi-port connector. In at least some embodiments, each of the retention arms includes a narrow neck portion adjacent to the housing and a wider band-retention portion adjacent to the narrow neck portion. In at least some embodiments, the USB cable further includes at least two retention bands, wherein each of the retention bands configured to be disposed around a cable attached to one of the at least two female USB connectors and one of the retention arms.

In at least some embodiments, the at least two ports is exactly two ports and the at least two female USB connectors is exactly two female USB connectors. In at least some embodiments, each of the at least two female USB connectors is spaced at least 20 mm from the opening of the port through which the female USB connector is accessible. In at least some embodiments, each of the at least two female USB connectors is spaced at least 30 mm from the opening of the port through which the female USB connector is accessible.

In at least some embodiments, the cable coupling element is the first connector and the first connector is selected from a USB A connector, USB 3.0 A connector, USB B connector, USB 3.0 B connector, USB C connector, USB Mini-A connector, USB Mini-B connector, USB Micro-A connector, USB Micro-B connector, USB 3.0 Micro-B connector, or a Lightning connector. In at least some embodiments, each of the at least two USB female connectors is selected from a USB A connector, USB 3.0 A connector, USB B connector, USB 3.0 B connector, USB C connector, USB Mini-A connector, USB Mini-B connector, USB Micro-A connector, or a USB Micro-B connector. In at least some embodiments, all of the at least two USB female connectors are a same type of USB connector.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present invention is directed to a multi-port cable. The present invention is also directed to a cable with at least two USB female sockets at one end and methods of making and using the cable. The multi-port cable can be used to couple one device to two or more additional devices. Such devices can include, but are not limited to, mobile devices (for example, tablets, mobile phones (such as cellphones or smartphones)), laptop computers, desktop computers, printers, scanners, input devices (such as keyboards, mice, trackballs, or the like), or storage devices (such as hard drives, solid-state drives, flash drives, or the like).

Figure 1:
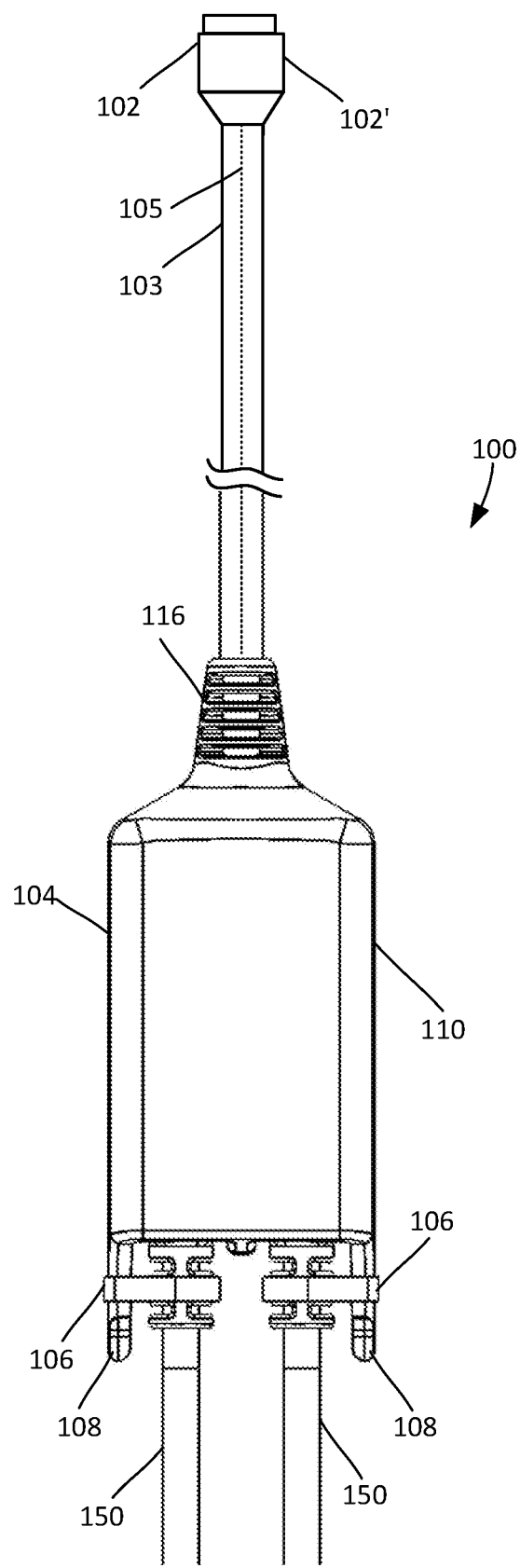
FIG. 1 is a schematic top view of a first embodiment of a multi-port USB cable with connectors of two cables inserted therein, according to the invention.

FIG. 1 illustrates one embodiment of a cable 100 with a cable coupling element 102, such as a first connector 102', and a multi-port connector 104 at opposite ends of the cable and a jacket 103 carrying multiple conductors 105 (for example, wires, traces, or the like—only one of which is illustrated in/FIG. 1) from the cable coupling element to the multi-port connector. As an alternative to the first connector as the cable coupling element 102, ends of the conductors 105 can be attached directly to cable coupling element such as a printed circuit board (which can contain a circuit or be attachable to a circuit) or device. In FIG. 1, two cables 150 (which are not part of cable 100) are shown plugged into the multi-port connector 104. For each of the cables 150, a retention band 106 encircles a portion of that cable 150 and a retention arm 108 extending from a housing 110 of the multi-port connector 104. The retention bands 106 secure the cables 150 to the multi-port connector 104. This can be particularly useful when the cable 150 is under, or may be placed under, tension that could unplug the cable 150 from the multi-port connector 104. Such tension may arise from, for example, normal or heavy usage, shock, vibration, or the like or any combination thereof.

The first connector 102' can be any suitable connector including, but not limited to, a USB A, USB 3.0 A, USB B, USB 3.0 B, USB C, USB Mini-A, USB Mini-B, USB Micro-A, USB Micro-B, USB 3.0 Micro-B, a Lightning connector, or the like or any other suitable connector. The first connector 102' can be a male connector or a female connector. For coupling to a desired mobile device or other device, a cable 100 with a suitable first connector 102' for coupling to that mobile device or other device should be selected or an adapter that adapts the first connector to the socket or connector on the mobile device or other device should be used. Any suitable device can be the cable coupling element 102 such as, but not limited to, mobile devices (for example, tablets, mobile phones (such as cellphones or smartphones)), laptop computers, desktop computers, printers, scanners, input devices (such as keyboards, mice, trackballs, or the like), or storage devices (such as hard drives, solid-state drives, flash drives, or the like).

Figure 2A:
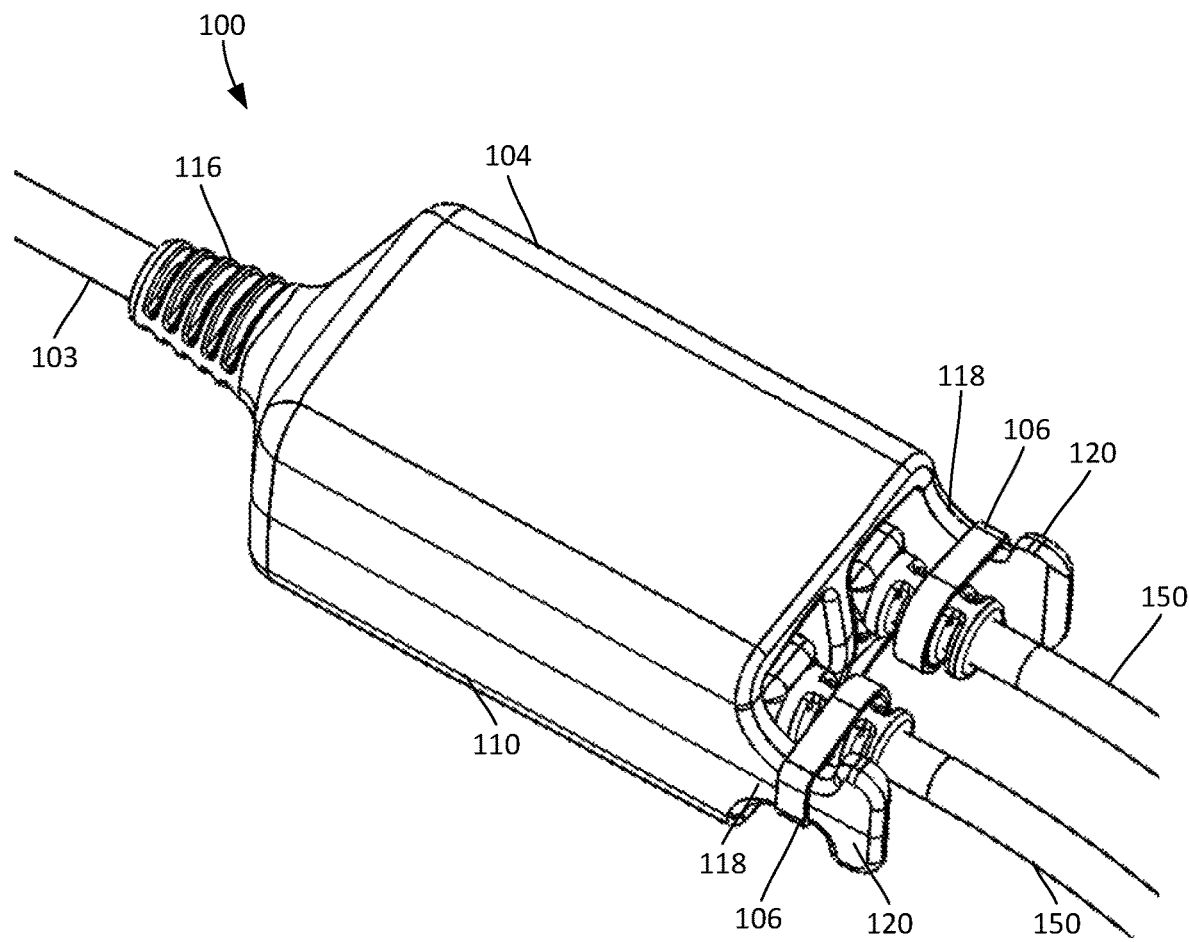
FIG. 2A is a schematic perspective view of a portion of the multi-port USB cable of FIG. 1 with the connectors of the two cables inserted therein, according to the invention.
Figure 2B:
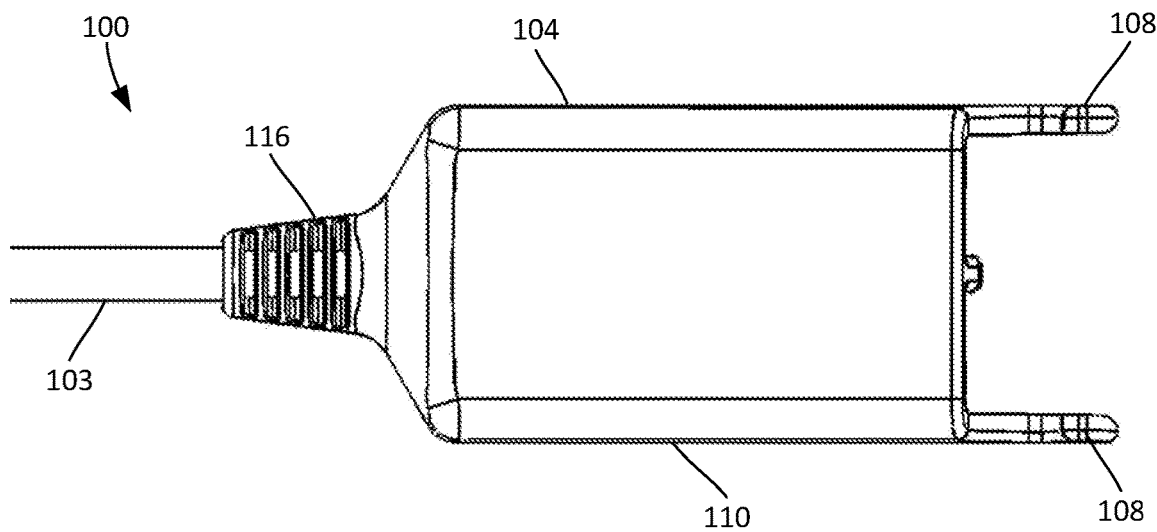
FIG. 2B is a schematic perspective top view of the portion of the multi-port USB cable of FIG. 1 with the connectors of the two cables removed, according to the invention.

FIG. 2A is a close-up view of the multi-port connector 104 with the cables 150 plugged in and retention bands 106 securing the cables 150 to the multi-port connector. FIG. 2B is close-up top view of the multi-port connector 104 without the cables 150 plugged in. The multi-port connector 104 includes a housing 110, an optional strain relief element 116 extending from the housing to (or over) a portion of the jacket 103 to reduce strain on the wires and jacket at the edge of the housing, and at least two retention arms 108 extending from the housing for securing the cables 150 to the multi-port connector 104. In at least some embodiments, each of the retention arms 108 includes a narrow neck portion 118 that separates the housing 110 from a wider band-retention portion 120 that prevents or hinders the retention band 106 from slipping off the retention arm 108 when tightened at the narrow neck portion.

The retention bands 106 can be any suitable type of band including, but not limited to, a cable tie, a zip tie, an elastic band, a wire, or the like or any combination thereof. In at least some embodiments, the retention band 106 can be reusable. In other embodiments, the retention band 106 is cut or otherwise damaged when removed.

Figure 2C:
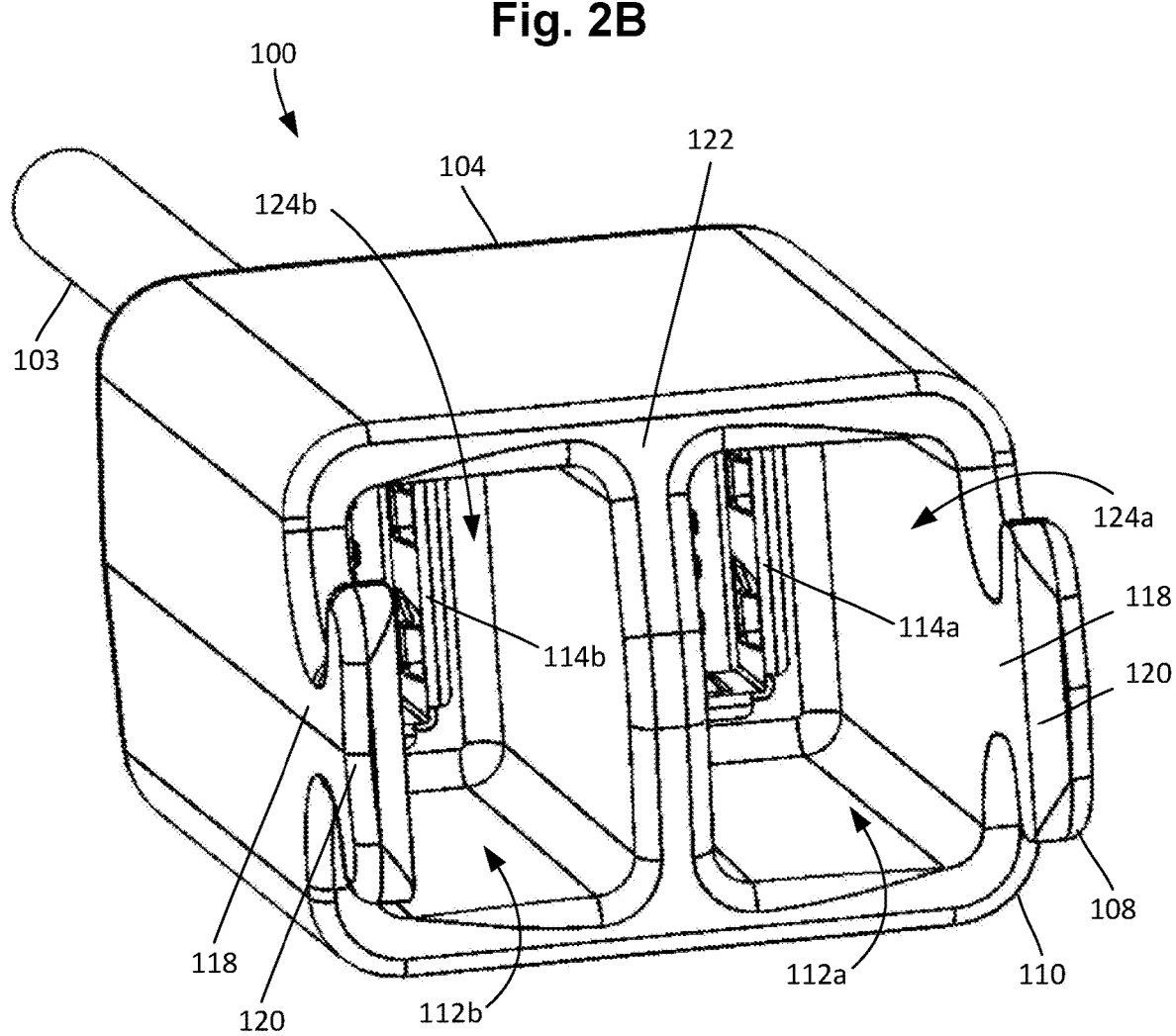
FIG. 2C is a schematic perspective view of the portion of the multi-port USB cable of FIG. 1 looking into the ports, according to the invention.

FIG. 2C is a view of into the ports 112a, 112b of the multi-port connector 104. A female USB connector 114a, 114b is accessible through each of the ports 112a, 112b. The housing 110 has a port face 122 that defines openings 124a 124b of the ports 112a, 112b. Each of the female USB connectors 114a, 114b can be a USB A, USB 3.0 A, USB B, USB 3.0 B, USB C, USB Mini-A, USB Mini-B, USB Micro-A, USB Micro-B, USB 3.0 Micro-B, any other USB connector. The two female USB connectors 114a, 114b can be the identical type of USB connector or can be different types of USB connectors. In at least some embodiments, the two female USB connectors 114a, 114b are spaced at least 3, 5, 10, 15, 20, 25, 30, or 40 mm from the opening 124a, 124b of the respective port 112a, 112b. Spacing the female USB connector 114a, 114b away from the opening 124a, 124b can facilitate securement of the cables 150 as a more substantial portion of the connector of the cable 150 is inserted into the respective port 124a, 124b.

Figure 3A:
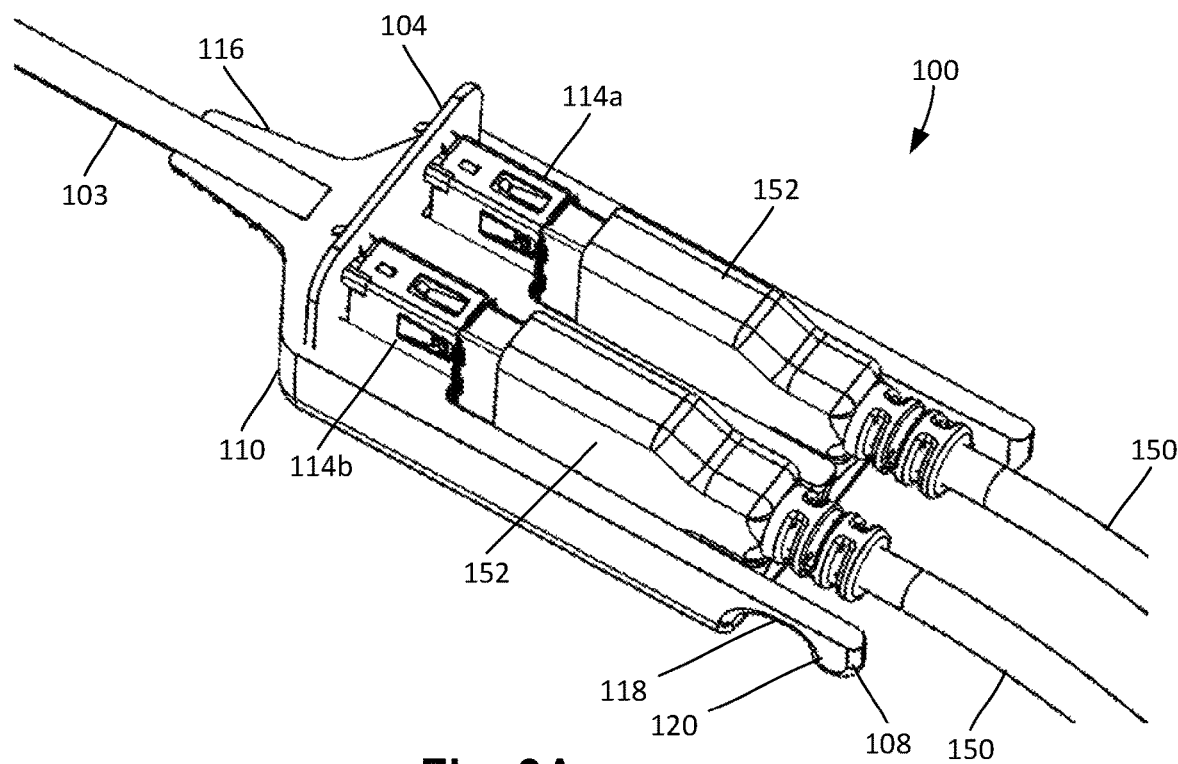
FIG. 3A is a schematic perspective partial-cut-away view of the portion of the multi-port USB cable of FIG. 1 with the connectors of the two cables inserted therein, according to the invention.
Figure 3B:
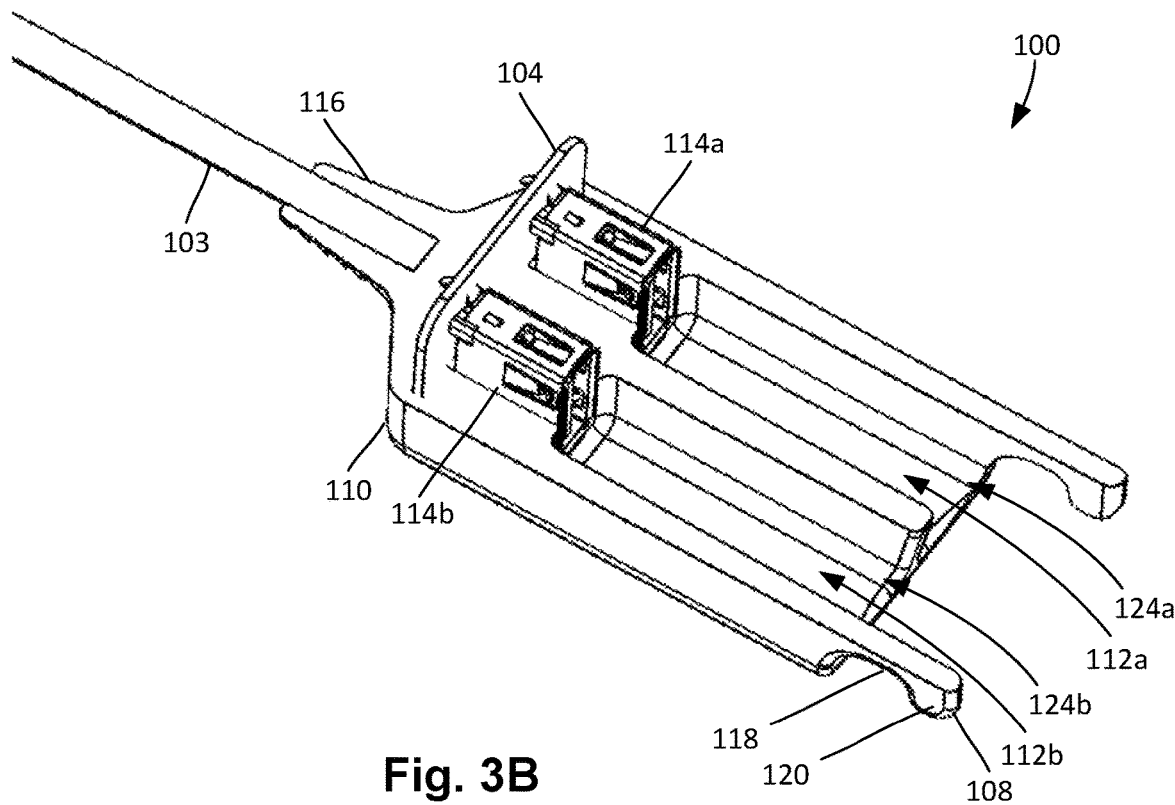
FIG. 3B is a schematic perspective partial-cut-away view of the portion of the multi-port USB cable of FIG. 1 with the connectors of the two cables removed, according to the invention.

FIGS. 3A and 3B are partial cut-away views of the multi-port connector 104 showing the female USB connectors 114a, 114b; ports 112a, 112b; openings 124a, 124b; and cables 150 with male plugs 152 (FIG. 3A). As is well known, the female USB connectors 114a, 114b have pins (not shown) that couple to contacts (not shown) in the female USB connector. The pins of the female USB connectors 114a, 114b are electrically coupled to respective conductors 105 (FIG. 1). Arrangements and methods for coupling pins of a USB or other connector to conductors are well-known. Corresponding pins of each of the female USB connectors 114a, 114b are coupled to the same connector. For example, positive power pins of the female USB connectors 114a, 114b are coupled to the same conductor which, in turn, is coupled to a corresponding positive power contact or pin of the first connector 102.

The Figures illustrate embodiments of a cable 100 with a multi-port connector 104 having two ports 112a, 112b and two female USB connectors 114a, 114b. It will be recognized that other multi-port connectors 104 can have three, four, five, six, or more ports and three, four, five, six or more female USB connectors. The illustrated embodiments show one female USB connector accessible through each port. It will be understood that other embodiments can include more than one female USB connector accessible through a port. In the illustrated embodiments, there is one retention arm 108 adjacent the opening 124a, 124b of each port 112a, 112b. In other embodiments, there may be more than one retention arm associated with one or more of the ports. In the illustrated embodiments, the retention arms 108 are disposed opposite each other with the ports 112a, 112b between the retention arms. In other embodiments, the retention arms may be disposed next to each other or in any other suitable arrangement.

In at least some embodiments, the cable 100 can provide a connection from a single device to multiple devices—for example, from a tablet or mobile phone to a printer and scanner; from a tablet or mobile phone to a keyboard and a mouse; from a tablet or mobile phone to a keyboard and a printer; or from a tablet or mobile phone to a scanner and a storage device (for example, a hard drive, a solid-state drive, a flash drive, or the like). In at least some embodiments, the cable 100 may find use on lift trucks, boats, planes, or other vehicles.

The above specification provides a description of the manufacture and use of the invention. Since many embodiments of the invention can be made without departing from the spirit and scope of the invention, the invention also resides in the claims hereinafter appended.

What is claimed is:

1. A USB cable, comprising
a cable coupling element selected from a first connector, a printed circuit board, or a device;
a multi-port connector comprising a housing, at least two ports defined by the housing, at least two female USB connectors disposed within the housing, and at least two retention arms extending from the housing, wherein a different one of the at least two female USB connectors is accessible through each of the at least two ports and a different one of the at least two retention arms is disposed adjacent an opening of each of the at least two ports;
a plurality of conductors electrically coupling the cable coupling element to the at least two female USB connectors; and
a jacket extending between the cable coupling element and the multi-port connector, wherein the conductors are at least partially disposed within the jacket.

2. The USB cable of claim 1, wherein each of the at least two retention arms comprises a narrow neck portion adjacent to the housing and a wider band-retention portion adjacent to the narrow neck portion.

3. The USB cable of claim 1, wherein the at least two ports is exactly two ports and the at least two female USB connectors is exactly two female USB connectors.

4. The USB cable of claim 3, wherein the at least two retention arms is exactly two retention arms are disposed opposite each other with two ports between the two retention arms.

5. The USB cable of claim 1, further comprising at least two retention bands, wherein each of the at least two retention bands configured to be disposed around a cable attached to one of the at least two female USB connectors and one of the retention arms.

6. The USB cable of claim 1, wherein each of the at least two ports has an opening defined by the housing and each of the at least two female USB connectors is spaced at least 20 mm from the opening of the port through which the female USB connector is accessible.

7. The USB cable of claim 1, wherein each of the at least two ports has an opening defined by the housing and each of the at least two female USB connectors is spaced at least 30 mm from the opening of the port through which the female USB connector is accessible.

8. The USB cable of claim 1, wherein the cable coupling element is the first connector and the first connector is selected from a USB A connector, USB 3.0 A connector, USB B connector, USB 3.0 B connector, USB C connector, USB Mini-A connector, USB Mini-B connector, USB Micro-A connector, USB Micro-B connector, USB 3.0 Micro-B connector, or a Lightning connector.

9. The USB cable of claim 1, wherein each of the at least two USB female connectors is selected from a USB A connector, USB 3.0 A connector, USB B connector, USB 3.0 B connector, USB C connector, USB Mini-A connector, USB Mini-B connector, USB Micro-A connector, or a USB Micro-B connector.

10. The USB cable of claim 1, wherein all of the at least two USB female connectors are a same type of USB connector.

11. A USB cable, comprising:
a cable coupling element selected from a first connector, a printed circuit board, or a device;
a multi-port connector comprising a housing, at least two ports defined by the housing, and at least two female USB connectors disposed within the housing, wherein a different one of the at least two female USB connectors is accessible through each of the at least two ports, wherein each of the at least two ports has an opening defined by the housing and each of the at least two female USB connectors is spaced at least 10 mm from the opening of the port through which the female USB connector is accessible;
a plurality of conductors electrically coupling the cable coupling element to the at least two female USB connectors;
a jacket extending between the cable coupling element and the multi-port connector, wherein the conductors are at least partially disposed within the jacket; and
at least two retention arms extending from the housing of the multi-port connector.

12. The USB cable of claim 11, wherein each of the retention arms comprises a narrow neck portion adjacent to the housing and a wider band-retention portion adjacent to the narrow neck portion.

13. The USB cable of claim 11, further comprising at least two retention bands, wherein each of the retention bands configured to be disposed around a cable attached to one of the at least two female USB connectors and one of the at least two retention arms.

14. The USB cable of claim 11, wherein the at least two ports is exactly two ports and the at least two female USB connectors is exactly two female USB connectors.

15. The USB cable of claim 11, wherein each of the at least two female USB connectors is spaced at least 20 mm from the opening of the port through which the female USB connector is accessible.

16. The USB cable of claim 11, wherein each of the at least two female USB connectors is spaced at least 30 mm from the opening of the port through which the female USB connector is accessible.

17. The USB cable of claim 11, wherein the cable coupling element is the first connector and the first connector is selected from a USB A connector, USB 3.0 A connector, USB B connector, USB 3.0 B connector, USB C connector, USB Mini-A connector, USB Mini-B connector, USB Micro-A connector, USB Micro-B connector, USB 3.0 Micro-B connector, or a Lightning connector.

18. The USB cable of claim 11, wherein each of the at least two USB female connectors is selected from a USB A connector, USB 3.0 A connector, USB B connector, USB 3.0 B connector, USB C connector, USB Mini-A connector, USB Mini-B connector, USB Micro-A connector, or a USB Micro-B connector.

19. The USB cable of claim 11, wherein all of the at least two USB female connectors are a same type of USB connector.

* * * * *